April 23, 1957 N. HEPNER 2,789,638
TIME DELAY MEANS FOR ROLLER TOWEL DISPENSING MECHANISMS
Filed Oct. 7, 1953 2 Sheets-Sheet 1

INVENTOR.
Neal Hepner
BY Daniel J. Cullen
Attorney

April 23, 1957  N. HEPNER  2,789,638
TIME DELAY MEANS FOR ROLLER TOWEL DISPENSING MECHANISMS
Filed Oct. 7, 1953  2 Sheets-Sheet 2

INVENTOR.
Neal Hepner
BY Daniel J. Cullen
Attorney

United States Patent Office 2,789,638
Patented Apr. 23, 1957

2,789,638

TIME DELAY MEANS FOR ROLLER TOWEL DISPENSING MECHANISMS

Neal Hepner, Detroit, Mich.

Application October 7, 1953, Serial No. 384,647

3 Claims. (Cl. 161—1)

This application discloses a novel time delay means for a roller tower dispensing mechanism particularly characterized by the fact that the delay is provided by the time required for a weight means or mass to shift from a high level to a low level slowly through a restricted passageway.

A further principal object of the present invention is to embody the foregoing concept in a device wherein a blocking and release member, which is the member that is moved with time delay by the differential of weight caused by the shifting of a weight means or mass slowly through a restricted passage from a high level to a low level for time delay, is in the form of a movable or rotatable part which is caused to move or rotate about a fulcrum by such movement of the weight means or mass.

A still further object of the present invention is to embody the foregoing concept in a device wherein the member is so formed that its fulcrum is between the two points of location of the weight means or mass and where the weight means or mass moves across such fulcrum.

A still further object of the present invention is to form such member with chambers or cavities connected by restricted passages and containing the weight means or mass which slowly moves through such passages from whichever cavity happens to be uppermost at a given moment to the other cavity which is then lowermost, with gravity being the force for moving the weight means from cavity to cavity and thus moving the member.

A still further object is to provide in such a device for the movement of the member so that the weight means or mass is returned to a higher level from a low level merely by the advance of clean toweling manually by the operator, with such manual movement furnishing the energy or force for return of the weight means from low level to high level. In other words, a particular object of the present invention is to provide in a roller towel dispensing mechanism a time delay means such that towel advance causes return of a time delay weight means or mass from a low level to a high level.

A still further object of the present invention is to provide a blocking member having cavities and passages containing a movable weight means or mass, which in one embodiment is in the form of a liquid such as mercury. In connection with the foregoing, a further object is to form the member as a hermetically sealed casing containing the liquid, and the fact that the casing is hermetically sealed removes forever the possibility that the liquid may deteriorate, leak, vaporize, diminish, be tampered with, or varied from any cause whatever.

A further object of the present invention is to provide a novel time delay means of the character and for the use above specified which is simpler and at least as satisfactory in operation as any time delay means now known for the purposes and which also has the added advantages of being constant in quality and effect.

A still further object is to provide a time delay means for roller towel dispensing utilizing the shifting of weight across the pivot of a pivoted blocking member, with the weight being in the form of a heavy fluent material which in one preferred embodiment is a mass of mercury.

In addition to all of the foregoing objects, there is a supplemental object to provide in a roller towel dispensing mechanism having a time delay means, a disabling means for disabling the time delay and thus permitting free movement of the dispensing mechanism. In the preferred embodiment, the disabling means is so positioned as automatically to be engaged by a cabinet door when the latter closes and to be moved by said door to a position where it can no longer engage and control and disable the time delay, with the disabling means likewise being so positioned as to move automatically when the door is opened to a position where the disabling means disables the time delay and permits free movement of the dispensing mechanism without time delay.

A still further object of the present invention is to provide a time delay means for roller towel dispensing mechanisms having a blocking member which is easily removable and replaceable by a different blocking member providing a different amount of delay. In the preferred embodiment, where a mass of mercury flows through fine passages or bores from side to side of a double lobe centrally pivoted member for time delay, the selection of members with various sizes of passages would provide a selection of varying degrees of time delay, it being obvious that a member having finer passages for the flow of mercury will provide for greater time delay than a member having coarser passages permitting faster flow of mercury.

In addition, an object of the present invention is to enable selective replacement of blocking members by having various arrangements of passageways, as for example, a member having passages differently constructed as to permit alternately of two different degrees of time delay. In one embodiment, where two passages of different sizes are used, there will be an alternation of a great increment of time delay and a lesser increment of time delay, thereby enabling two advances of roller towels in quick succession followed by a substantial delay before a third advance is permitted.

Further objects of the present invention will be understood upon reference to the appended drawings disclosing a preferred embodiment.

Figure 3:
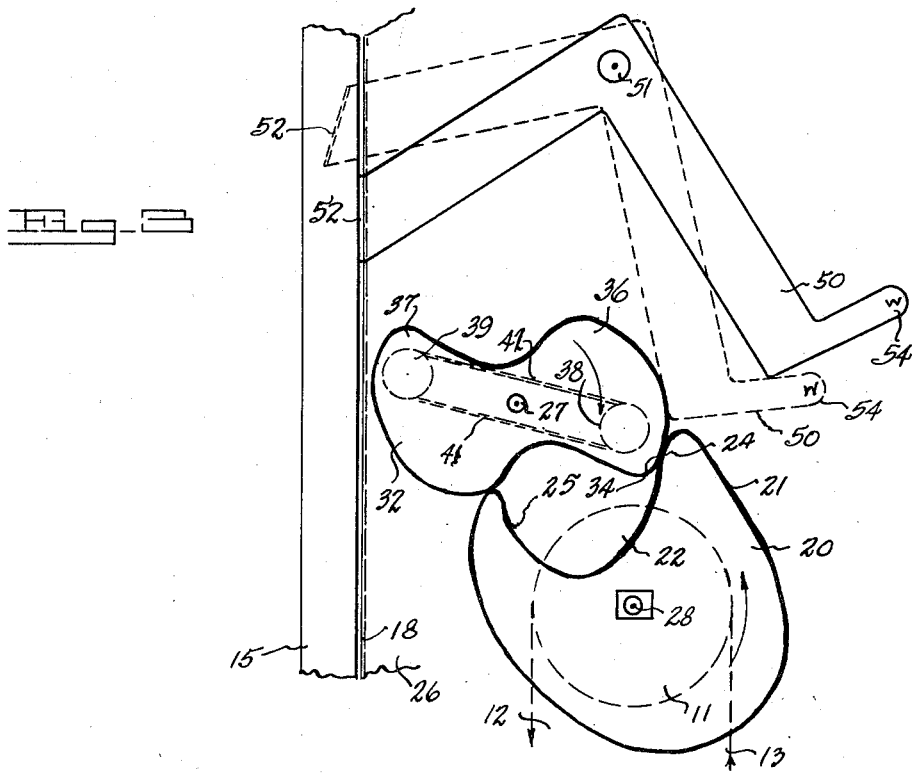
Fig. 3 is a view like Fig. 2 but showing the parts in a position where a time delay member blocks an element and the dispensing roller against towel dispensing movement.

Fig. 3, in addition, shows a means for disabling time delay.

Figure 1:
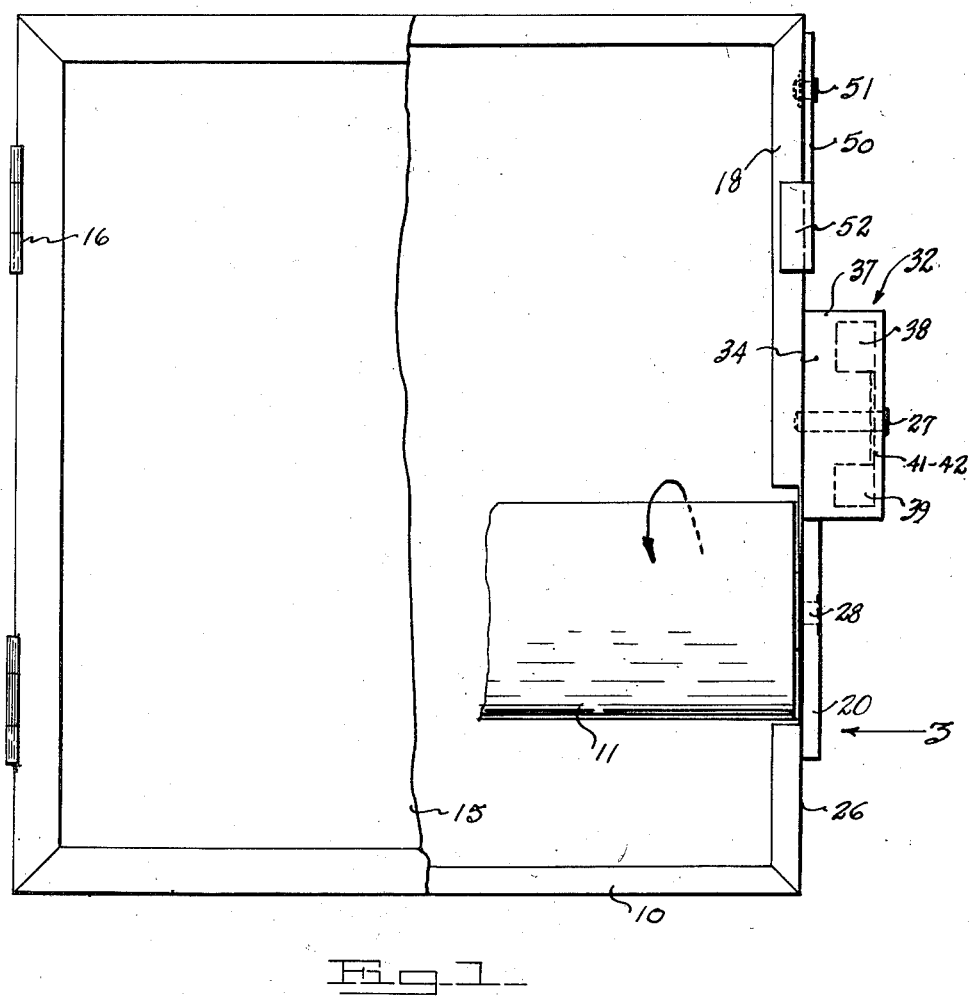
Fig. 1 is a fragmentary front view of a roller towel cabinet incorporating the time delay means of the present invention.

A conventional cabinet type roller towel dispensing device as shown in Fig. 1 comprises a cabinet 10 in which is located a rough surfaced dispensing roller 11 over which a loop of toweling is partly wrapped to provide a pull out portion 12 and a trailing portion 13. The abrasive surface of the roller 11 in contact with the towel loop 12—13 provides a friction grip for the toweling such that pull on the towel loop 12 for advance of toweling is accompanied by a counterclockwise rotation of the roll 11, as will readily be understood, with the circumference of roll 11 defining the length of toweling being advanced.

The open front of the cabinet is closed by a door 15 hinged at 16, which when opened exposes the interior of the cabinet for replenishing the supply of toweling or for any other purpose and which when closed seals the cabinet, with the door in contact with an edge flange 18 of the cabinet.

The construction thus far described is conventional and in such conventional constructions it has been known to provide a time delay mechanism so constructed as to require time delay between successive pulls of the towel loop 12 and successive rotations of the roller 11.

This application discloses a novel time delay means and the same will now be described.

Secured and keyed to roll 11 so as to rotate at all times therewith is an element 20 having an outer edge 21 and a large notch 22 providing an inner edge 24 and a part 25. Element 20 is on the outside wall 26 of the cabinet.

Removably journaled on the side wall 26 of the cabinet 10, on an axis 27 parallel to the axis 28 of the roll 11 and somewhat removed from such axis 28, is an important and novel element of the invention, namely a double lobe centrally pivoted blocking member 32 whose specific details of construction will now be described.

Such member 32 has an edge 34 and also has two lobes 36 and 37 on opposite sides of the pivot axis 27, and has two chambers or cavities 38 and 39 connected by passage means 41 and 42 and containing a weight means, which in the form shown is a mass of mercury which forms a heavy fluid material weight means which is slowly shiftable across the pivot 27 from lobe 36 to lobe 37 to rotate the member 32 in response to the accumulation of a differential of weight of the opposed lobes developed by the shifting of the mercury from whichever cavity at the moment happens to be uppermost to the other cavity through whichever passageway happens at the moment to be lowermost, the other passageway during such operation venting the lowermost cavity as it slowly fills with mercury from the uppermost cavity.

Operation

Without regard to the disabling means 50 shown in Fig. 3 for disabling the time delay operation and which disabling means is itself rendered inoperative by the closing of the door 15, as in normal operation, the normal operation of the time delay means per se will now be described.

Figure 2:
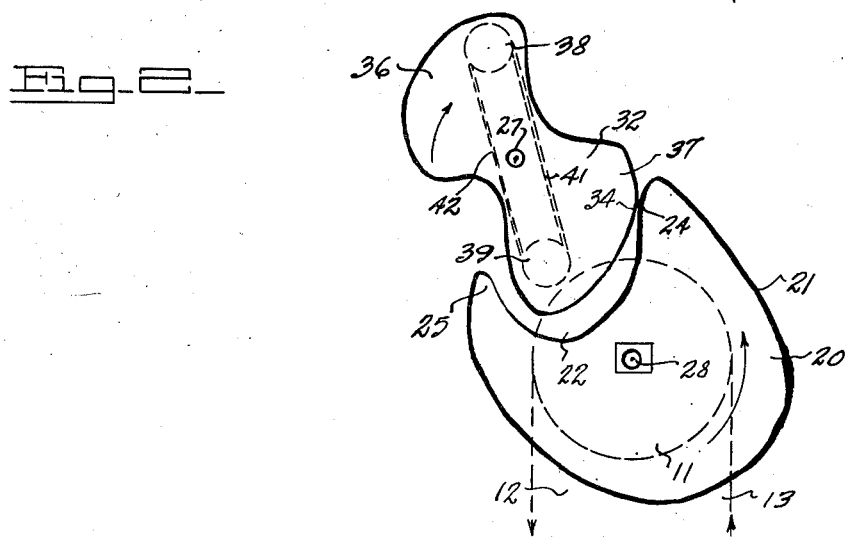
Fig. 2 is a view as if from the right in Fig. 1 showing certain of the parts in a rest or normal position where the dispensing roller is free for dispensing movement.

The normal or rest position of the parts, shown in Fig. 2 is as follows. The element 20 is in a vertical position with notch 22 at the upper side of the element and containing lobe 37 of member 32, and with a lower cavity of the member 32 filled with mercury and with an upper cavity empty. The roll 11 is free now to move counterclockwise in response to pull on towel loop 12, there being nothing to block the roll 11 or the element 20 or the member 32 from moving in their respective directions, namely counterclockwise for roll 11 and element 20, and clockwise for member 32.

When the towel loop 12 is first pulled down, the parts rotate as just described to the position of Fig. 3 with the roll 11 and the element 20 rotating 360° counterclockwise but with the member 32 in the latter part of such rotation being prevented from rotating clockwise by the weight in the upper cavity then at the left side of pivot 27. Part 25 of element 20 engages the left lobe of member 32 to hold it against improper or counterclockwise rotation due to the weight in the then upper cavity overcoming that in the lower cavity.

When notch 22 of the element 20 reaches the position shown in Figs. 2–3, such notch frees the member 32 to rotate clockwise under the influence of the accumulated differential of weight represented by the mass of mercury in the then lower cavity, but this occurs only after the then upper cavity has emptied into the then lower cavity.

Edge 21 prevents member 32 from rotating more than 180° clockwise, which it would do if the towel were pulled rapidly so as to cause the rotational inertia of member 32 to be excessive. The rotational inertia tends to turn member 32 clockwise, while the mass of mercury in the cavity being elevated tends to prevent the clockwise rotation. Edge 21 serves to dissipate the rotational inertia of member 32 and guide and position member 32 so that it will serve its purpose of blocking element 20. The mercury in the uppermost cavity prevents further clockwise rotation of member 32, but this is true only after the rotational inertia of member 32 has been dissipated. It follows that the rotational inertia of member 32 must be dissipated by edge 21 before the element 20 advances counterclockwise 360° or even 270°. The mercury at the upper level prevents clockwise rotation of the member 32 only when the notch 22 begins to approach the upward position.

Normally the speed of movement of roll 11 and element 20 provided by the pull on towel 12 is considerably greater than the speed of flow of mercury from the upper cavity to the lower cavity in member 32 and consequently there will be an interval of delay until the mercury has flown from the upper cavity to the lower cavity.

When enough time has elapsed following the pull on towel 12 and counterclockwise rotation of roll 11 and element 20, for the lower cavity of element 32 to fill and the upper cavity to empty, the member 32 will rotate clockwise in response to the accumulated differential of weight and will again move towards the position of Fig. 2.

When parts 32 and 20 are in the position of Fig. 3, edge 34 of member 32 is in engagement with edge 24 of element 20, thus blocking element 20 against further rotation counterclockwise in response to pull on towel loop 12 and thus blocking movement of the roll and the dispensing of toweling.

With the swinging of member 32 clockwise towards the position of Fig. 2, no longer will the edge 34 of member 32 block the element 20 against further counterclockwise rotation and thus the element 20 and the roll 11 are free again for counterclockwise rotation and the towel loop 12 is free to be pulled out for dispensing still another length of toweling. During such second dispensing movement, the roll 11 and the element 20 will again rotate counterclockwise to the position of Fig. 3 going through a cycle of 360°, and element 20 will rotate member 32 clockwise from the position of Fig. 2 to that of Fig. 3, now again positioning a filled cavity uppermost and an empty cavity lowermost and enabling mercury to empty from the upper cavity and fill the lower cavity and provide the accumulation of weight differential necessary for causing rotation of the member 32 from the position of Fig. 3 towards that of Fig. 2 for again freeing the mechanism for towel dispensing.

Thus, two cycles of rotation of roll 11 and element 20, caused by two pulls on towel 12 successively, cause one 360° or two 180° movements of member 32.

It will be observed that the member 32 holds for delay because of the differential of weight of the left side minus the weight of the right side, and releases by the differential of weight of the right side minus that of the left side. When the latter differential reaches a predetermined degree the member 32 will swing clockwise from the blocking or horizontal position towards the freeing or vertical position to free the element 20 and free the roll 11 to move 360° counterclockwise and in so doing to rotate the member 32 clockwise to a horizontal position.

The member 32 is removably mounted on the side 26 of the casing 10 so as to be replaceable by other members 32 of the same general construction but differing as to time delay rates. For example the member 32 shown may be replaced by another member 32 having finer passages 41 and 42 which provide for a slower flow of mercury in the member 32 and thus for a slower release or a greater time delay for towel dispensing. The reverse is likewise true, a member 32 may be replaced by another having coarser passages 41—42 for faster release and less time delay.

Likewise, a member 32 having equal size passages as shown may be replaced by one having unequal size passages, one passage being larger than the other, to permit alternation of large units of time delay with small units of time delay, thereby enabling two pulls or dispensing movements of toweling in quick succession followed by a substantial delay. In fact, if desired, a member 32 having one fine passage for time delay and one very coarse passage for no time delay may be provided to enable a double length of toweling, i. e., two lengths with no delay between them, to be advanced. This operation is possible because the member 32 has two passages, alternately operating, with the size of each passage being independently determinable, for varying time delay from zero to maximum for each cycle of operation.

It will be observed that two passages are provided to connect the cavities 38 and 39. Whichever passageway happens to be lowermost is the passageway through which mercury will flow from the uppermost cavity to the lowermost cavity and the other passageway at that time will operate as a vent for venting the lowermost cavity. As a member 32 is rotated 180° during each cycle of towel dispensing, the passages alternately become flow passages and vent passages, it being observed that the member rotates only 180° during a cycle whereas the roller 11 and the element 20 rotate 360° per cycle.

It will also be observed that the time delay is caused by the differential of weight responding to the shifting of the mercury mass slowly through the restricted passages 41—42 from a high level chamber to a low level chamber and causes the member 32 containing these chambers to swing about its fulcrum or pivot 27 and that in the particular embodiment disclosed the fulcrum or pivot 27 is between the two chambers in which the mercury or weight mass is located and that such mass moves across the pivot or fulcrum 27.

It will also be observed that the mercury or weight mass is returned to a high level from a low level merely by the exchange of cavities caused by the manual force provided by the pulling out or advance of clean toweling by the operator who thus furnishes the energy for liquid or weight mass return. Thus the device here shown is characterized by the fact that towel advance itself causes return of the liquid or weight mass from a low level to a high level.

It will also be observed that the member 32 is in the form of a hermetically sealed casing. Consequently, the weight means or mass within such casing remains constant in quality and character and effect. It never deteriorates, leaks, vaporizes, nor diminishes and can never be tampered with nor varied from any cause whatever.

The time delay disabling means

Fig. 3 shows a time delay disabling means in the form of a lever 50 pivoted at 51 to the side 26 of the casing and having a portion 52 overlapping the edge 18 of the casing in position to be engaged by the door 15 when the latter closes. Biasing means such as weight 54 constantly biases the lever 50 clockwise. The biasing means could also be a spring if desired.

Normally the cabinet door 15 is closed and engages portion 52 to move it to the full line position of Fig. 3 overcoming the bias of weight 54 and rendering the disabling means 50 completely inoperative. This is accomplished automatically merely by the closing of the door 15.

However, when the door 15 is opened to give access to the interior of the cabinet, the lever 50 is automatically moved by its biasing means 54 to the dotted line position shown in Fig. 3 where lever 50 will engage the edge 34 of member 32 and constantly bias such member to rotate clockwise completely independently and regardless of the presence or absence of the flow of mercury from cavity to cavity of such member and thus completely eliminating any interval of time delay and thus enabling rapid and free movement of the towel 12 and the roll 11 and the element 20 and likewise of the member 32. Thus the disabling means 50 disables the time delay operation of the member 32 and enables free dispensing of toweling during the time the cabinet door 15 is opened, that is to say during the time an operator wishes to move the towel without delay for purposes of replacing toweling or for any other purpose.

The lever 50 which disables the time delay of the member 32 is itself disabled automatically by the closing of the door 15, and thus the time delay operation is automatically reestablished by the closing of the door.

Thus, the freeing of the parts from time delay operation is accomplished automatically merely by the opening of the door 15 and this is accomplished by the automatic response to the bias of the weight 54 and the freeing of the lever 50 from the influence of the door 15.

Now having described the construction herein disclosed, reference should be had to the claims which follow for a determination of the scope of the present invention.

I claim:

1. A time delay device for arresting and restraining for a time interval the rotation of a rotatable member, comprising a control element rotatable about a first pivot axis, means coupling said control element to said rotatable member for rotation therewith, said control member having an upwardly opening recess extending radially inwardly from the periphery thereof, a blocking member freely swingable about a second pivot axis spaced from said first pivot axis, said blocking member having chambers at each end thereof connected by restricted passageways and containing a mass movable by gravity through at least one of said restricted passageways from whichever chamber is at a higher level to whichever chamber is at a lower level, the shifting of said mass to one end of said blocking member shifting the center of gravity thereof and creating a force couple urging the blocking member into a non-blocking position in which its longitudinal axis extends in a substantially up and down direction, said blocking member in non-blocking position having said one end suspended within said control member recess, one corner of said recess being positioned to abut said one end upon said control member being rotated in one direction to swing said blocking member in an opposite rotative direction out of said recess into an angular dwell position in which the longitudinal axis thereof approaches a substantially horizontal position with the lower chamber still below the upper chamber, the peripheral surface of said control member being provided with a cam contour against which said blocking member is held by said force couple substantially in said angular dwell position as the control member is rotated, said cam contour being provided with a rise effective after said control member has been rotated to a position in which the other end of said blocking member overhangs said recess to further swing said blocking member into a position in which said other end is dipped partially into said recess in abutting relation to the other corner thereof to block further turning movement of said control member, and in which last mentioned position said lower chamber becomes the higher chamber, said mass then flowing during a time interval into the now lower chamber through at least one of said restricted passageways to fill the now lower chamber and shift the center of gravity of said blocking member from said one end to said other end thereby to cause said other end to freely swing into said recess so that said blocking member again attains a substantially up and down non-blocking position whereby the cycle may be repeated.

2. A time delay device for arresting and restraining for a time interval the rotation of a unidirectional rotatable member, comprising a control element rotatable about a first pivot axis, means coupling said control element to said rotatable member for rotation therewith, said control member having an upwardly opening recess extending radially inwardly from the periphery thereof, an elongated blocking member pivoted intermediate its ends for swinging movement about a second pivot axis spaced above said first pivot axis, said blocking member having chambers at each end thereof connected by at least two parallel restricted passageways located on opposite sides of said second pivot axis and containing a mass movable by gravity through at least one of said restricted passageways from whichever chamber is at a higher level to whichever chamber is at a lower level, the shifting of said mass to one end of said blocking member shifting the center of gravity thereof and creating a force couple urging the blocking member into a non-blocking position in which its longitudinal axis extends in a substantially up and down direction, said blocking member in non-blocking position having said one end suspended within said control member recess, one corner of said recess being positioned to abut said one end upon said control member being rotated in one direction to swing said blocking member in an opposite rotative direction out of said recess into tangential contact with the peripheral surface of said control member, the periphery of said control member being provided with a cam contour against which said blocking member is held by said force couple in an angular dwell position as the control member is rotated, said blocking member in said angular dwell position approaching substantially a horizontal position but with the lower chamber still below the upper chamber, said cam contour being provided with a rise effective after said control member has been rotated to a position in which the other end of said blocking member overhangs said recess to further swing said blocking member into a position in which said other end is dipped partially into said recess in abutting relation to the other corner thereof to block further turning movement of said control member, and in which last mentioned position said lower chamber becomes the higher chamber, said mass then flowing during a time interval into the now lower chamber through at least one of said restricted passageways to fill the now lower chamber and shift the center of gravity of said blocking member from said one end to said other end thereby to cause said other end to freely swing into said recess so that said blocking member again attains a substantially up and down non-blocking position whereby the cycle may be repeated.

3. A time delay device for arresting and restraining for a time interval the rotation of a unidirectional rotatable member, comprising a control element rotatable about a first pivot axis, means coupling said control element to said rotatable member for rotation therewith, said control member having an upwardly opening recess extending radially inwardly from the periphery thereof, an elongated blocking member pivoted intermediate its ends for swinging movement about a second pivot axis spaced above said first pivot axis, said blocking member having chambers at each end thereof connected by at least two parallel restricted passageways located on opposite sides of said second pivot axis and containing a mass movable by gravity through at least one of said restricted passageways from whichever chamber is at a higher level to whichever chamber is at a lower level, the shifting of said mass to one end of said blocking member shifting the center of gravity thereof and creating a force couple urging the blocking member into a non-blocking position in which its longitudinal axis extends in a substantially up and down direction, said blocking member in non-blocking position having said one end suspended within said control member recess, one corner of said recess being positioned to abut said one end upon said control member being rotated in one direction to swing said blocking member in an opposite rotative direction out of said recess into tangential contact with the peripheral surface of said control member, the periphery of said control member being provided with a cam contour against which said blocking member is held by said force couple in an angular dwell position as the control member is rotated approximately three quarters of a revolution, said blocking member in said angular dwell position approaching substantially a horizontal position but with the lower chamber still below the upper chamber and with said passageways remaining upwardly inclined, said cam contour being provided with a rise effective in substantially the last quarter revolution of said control member to further swing said blocking member into a position in which said other end is dipped partially into said recess in abutting relation to the other corner thereof to block further turning movement of said control member, and in which last mentioned position said lower chamber becomes the higher chamber and said passageways become downwardly inclined, said mass then flowing during a time interval into the now lower chamber through at least one of said restricted passageways to fill the now lower chamber and shift the center of gravity of said blocking member from said one end to said other end thereby to cause said other end to freely swing into said recess so that said blocking member again attains a substantially up and down non-blocking position whereby the cycle may be repeated.

References Cited in the file of this patent
UNITED STATES PATENTS

| Number | Name | Date |
| --- | --- | --- |
| 1,670,002 | Pferdmenges | May 15, 1928 |
| 1,724,228 | Steiner | Aug. 13, 1929 |
| 2,172,482 | Steiner | Sept. 12, 1939 |
| 2,175,141 | Wooster | Oct. 3, 1939 |
| 2,359,320 | Lewis | Oct. 3, 1944 |
| 2,708,375 | Layton | May 17, 1955 |

FOREIGN PATENTS

| Number | Country | Date |
| --- | --- | --- |
| 8,187 | Switzerland | of 1894 |